(12) United States Patent
Kittel et al.

(10) Patent No.: US 8,473,235 B2
(45) Date of Patent: Jun. 25, 2013

(54) METAL DETECTOR

(75) Inventors: Clive Francis Kittel, Pensford (GB); Paul Jeffrey King, Wellingborough (GB)

(73) Assignee: Illinois Tool Works Inc., Glenview, IL (US)

( * ) Notice: Subject to any disclaimer, the term of this patent is extended or adjusted under 35 U.S.C. 154(b) by 774 days.

(21) Appl. No.: 11/883,950

(22) PCT Filed: Jan. 9, 2006
(Under 37 CFR 1.47)

(86) PCT No.: PCT/GB2006/000058
§ 371 (c)(1),
(2), (4) Date: Jun. 12, 2009

(87) PCT Pub. No.: WO2006/087510
PCT Pub. Date: Aug. 24, 2006

(65) Prior Publication Data
US 2012/0179394 A1    Jul. 12, 2012

(30) Foreign Application Priority Data
Feb. 16, 2005  (GB) .................................. 0503188.5

(51) Int. Cl.
*G01N 33/02* (2006.01)
*G01N 27/90* (2006.01)
*A23L 1/025* (2006.01)
*G06F 19/00* (2011.01)

(52) U.S. Cl.
USPC ............ 702/81; 73/865.8; 324/222; 324/228; 324/244; 426/234; 426/237; 702/1; 702/127

(58) Field of Classification Search
USPC ................. 73/865.8, 866; 324/200, 222, 228; 324/244; 426/231, 234, 237; 702/1, 57, 81, 702/127, 187, 189; 250/336.1, 358.1, 259.1, 250/360.1, 910

IPC .................. A23L 1/00,1/025; G01D 5/00, 5/12, G01D 5/14; G01N 27/00, 27/72, 27/82, 27/90, G01N 33/00, 33/02; G06F 11/00, 11/30, G06F 11/32, 17/00, 17/40, 19/00
See application file for complete search history.

(56) References Cited

U.S. PATENT DOCUMENTS 3,495,166 A * 2/1970 O'Connor et al. ............ 324/238
4,276,484 A   6/1981 Riveros
(Continued)

FOREIGN PATENT DOCUMENTS

EP    0379804 A2 * 8/1990
GB    2 204 133 A   11/1988
(Continued)

OTHER PUBLICATIONS

IEEE transactions on geoscience and remote sensing, vol. 39, No. 6, Jun. 2001, Carl V. Nelson et al., "Wide bandwidth time-domain electromagnetic sensor for metal target classification", pp. 1129 to 1138, especially p. 1130, left column, first bullet point.

(Continued)

*Primary Examiner* — Edward Cosimano
(74) *Attorney, Agent, or Firm* — McCarter & English, LLP

(57) ABSTRACT

The present invention provides apparatus for scanning a product to detect metal in that product. The apparatus comprises a drive coil (4), for generating an electromagnetic field in the product, and a detection coil arranged to detect fluctuations in the magnetic field caused by the presence of a metallic particle in the product. A drive circuit (26) for the drive coil (4) comprises a plurality of switches (19 to 22) driven by a controller (16), which switch alternately connect the drive coil across a potential difference to cause the drive coil to be driven at an operating frequency determined by operation of the switches. Using a switching circuit to drive the drive coil (4) greatly increases the number of frequencies at which the drive coil may be operated. The invention has particular application to the food industry.

22 Claims, 7 Drawing Sheets

U.S. PATENT DOCUMENTS

| | | | |
|---|---|---|---|
| 4,821,023 | A | 4/1989 | Parks |
| 4,837,511 | A | 6/1989 | Whittington et al. |
| 4,965,522 | A | 10/1990 | Hazen |
| 5,548,214 | A * | 8/1996 | Yasohama et al. ............ 324/240 |
| 5,642,050 | A | 6/1997 | Shoemaker |
| 5,650,726 | A | 7/1997 | Gasnier et al. |
| 5,729,143 | A | 3/1998 | Tavernetti |
| 5,859,533 | A | 1/1999 | Gasnier et al. |
| 5,994,897 | A | 11/1999 | King |
| 6,130,489 | A | 10/2000 | Heimlicher |
| 6,437,573 | B1 | 8/2002 | Golder et al. |
| 6,541,965 | B1 * | 4/2003 | Binder et al. ................. 324/243 |
| 6,724,191 | B1 | 4/2004 | Larsen |
| 6,825,655 | B2 * | 11/2004 | Minchole et al. ............. 324/204 |
| 7,123,016 | B2 * | 10/2006 | Larsen .......................... 324/326 |
| 7,355,409 | B2 * | 4/2008 | Larsen .......................... 324/326 |
| 7,423,422 | B2 * | 9/2008 | Kubotera et al. ............. 324/228 |
| 7,705,598 | B2 * | 4/2010 | Larsen .......................... 324/326 |
| 2003/0076087 | A1 * | 4/2003 | Minchole et al. ............. 324/204 |
| 2003/0141866 | A1 | 7/2003 | Johnson et al. |
| 2003/0169032 | A1 * | 9/2003 | Minchole et al. ............. 324/204 |
| 2004/0196045 | A1 * | 10/2004 | Larsen .......................... 324/329 |
| 2006/0226833 | A1 * | 10/2006 | Kubotera et al. ............. 324/236 |
| 2006/0238199 | A1 * | 10/2006 | Larsen .......................... 324/329 |
| 2008/0309344 | A1 * | 12/2008 | Larsen .......................... 324/326 |

FOREIGN PATENT DOCUMENTS

| | | | |
|---|---|---|---|
| GB | 2204133 | A * | 11/1988 |
| GB | 2 372 329 | A | 8/2002 |
| GB | 2372329 | A * | 8/2002 |
| GB | 2423366 | A * | 8/2006 |
| GB | 2462212 | A * | 2/2010 |
| JP | 57-30971 | A * | 2/1982 |
| JP | 59060274 | | 4/1984 |
| JP | 7-12952 | A * | 1/1995 |
| JP | 2606555 | B2 * | 5/1997 |
| JP | 9-304546 | A * | 11/1997 |
| JP | 2000-056032 | | 2/2000 |
| JP | 2000-056032 | A | 2/2000 |
| WO | WO 88/03273 | | 5/1988 |
| WO | WO 02/25318 | A1 * | 3/2002 |

OTHER PUBLICATIONS

Cintex Sentry, Metal Detection System Variable Frequency User Manual, V 1.4.2, Jul. 2005 pp. 1-63.
Loma Launches Cintex Brand Sentry VF, First-Ever, Variable Frequency Metal Detector, Jul. 27, 2004.
Intellectual Property Office Application No. GB0916505.1 Search Report Under Section 17, Nov. 25, 2009.
UK Patent Office Application No. GB0503188.5 Search Report Under Section 17, Aug. 1, 2005.
Variable Frequency Metal Detector, Feb. 7, 2005, (see URL on printout).
Cintex Sentry VF Variable Frequency Metal Detector, Nov. 2004.
Cintex Ltd. Food Trade Review, Feb. 1, 2004.
Operating Manual THSV333x, Dec. 5, 2001.
Operating Manual THSV33x, Oct. 31, 2000.
Food Trade Review, Constant Metal Detection (Brief Article), Sep. 1, 1999.
Letter of Sep. 5, 2012 from Mettler-Toledo counsel to ITW counsel.

* cited by examiner

METAL DETECTOR

The present invention relates to apparatus for scanning a substance or product to detect metal in that substance or product and in particular, but not exclusively, relates to such apparatus for the detection of metal particles on or in food product or in packaging associated with that product. However, the apparatus may have application to many substances or product types, for example for the detection of metal particles (broken needles) in training shoes or for the detection of metal in ore (prior to entering processing machinery). The substance or product will hereinafter be referred for the purposes of this specification, including the claims, as a product.

In the food processing industry there is always the concern that a food product will contain a metal item or particle as a result of a particular process. For example a small nut or washer may become loose and fall into the product or, due to misalignment of machinery, very fine slivers, or turnings, of metal may be created by one metallic object acting against another.

Apparatus for detecting metal contaminants in products such as food is well known, one example being disclosed in International Patent Application, Publication Number WO 02/25318. Such apparatus detects metal by inducing a magnetic field in the product, normally by means of a drive coil extending around the product. Two detection coils are then normally placed one to either side of the drive coil and connected in series and in opposite sense. In the absence of a metal particle the drive coil produces an equal and opposite effect in both of the detector coils and thus a zero output is obtained from the two detector coils.

When a contaminant metal particle is transported in a food product, normally by means of a conveyor belt, through the coils it disturbs the magnetic field. Because at one point the contaminant will be closer to one of the detector coils than the other the effect on that coil will be greater than on the other coil and thus a non-zero output will be obtained from the two detection coils. For convenience, the two detector coils will from hereon be considered as a single detector coil comprising two parts.

A metal particle it is desired to detect may create as little as a 1 in 10 million disturbance in the magnetic field. To detect such a disturbance, the sensitivity must very high. However the signal generated by a food product, take for example a chicken, passing through the detector is far greater than the that generated by a small metal particle. This can be to some extent overcome by comparing the phase of the output signal with that of the drive signal, as described briefly below with reference to FIGS. 1 to 3 of the drawings.

With reference to FIG. 1, a perfect magnetic material passing through a metal detector, as described above, will provide an output signal $V_{S1}$ in phase with the drive signal $V_D$. The component of an output signal resulting from a magnetic metal, such as soft iron, will also substantially be in phase with the drive signal. In contrast, a perfect conductor (superconductor) would produce a signal $V_{S2}$ in anti-phase to the drive signal and the component of the output signal associated with a metal which is a good conductor, for example copper, will have a major component in anti-phase with the drive signal. This arises because of the inductive coupling with the magnetic field generated by the drive coil.

The above describes the fundamental operation of a metal detector and such a device is capable of detecting particles of certain types of metal. However, such a detector may not satisfactorily detect small particles of a metal such as stainless steel, widely used in the food processing industry.

In the case of non-magnetic and weakly conductive materials, there will be an output signal $V_{S3}$ resulting from loss due to resistance. Food product is often slightly conductive, due to the presence of salt and water, and therefore if we consider the case of the chicken passing through the detector, this will generate a large output signal which will vary in magnitude as the chicken passes through the detector, simply because of the volume of chicken effecting the field. However, the phase of the signal, $V_{S3}$, will be constant because the lossy and conductive properties will be substantially the same throughout the chicken. This may for example be 110° out of phase with the drive signal, due to the vector $V_{S3}$ comprising largely of a resistive component but also having a small component due to the slightly conductive nature of the chicken. Most moist food products will exhibit similar properties and a chicken is given as an example simply because it is convenient to visualise.

The above described differences in phase can be and are utilised in metal detection apparatus. Typically, a product is passed through the apparatus and the phase of the resultant signal noted. A voltage signal $V_{ref}$ can then be generated, as illustrated in FIG. 2, based on the drive signal. The phase of $V_{ref}$ is adjusted until $V_{ref}$ is in phase quadrature with the output signal $V_{S3}$ for a non-contaminated food product. $V_{ref}$ and $V_{S3}$ are then compared by a phase sensitive detector which will provide a substantially zero output signal. (Signals in phase quadrature provide a zero output.)

When a food product has a metal particle embedded in it, either of a magnetic material or a conductive material, then the output signal will comprise an additional component $V_{S8}$ (see FIG. 2), and therefore equal to $V_{S3}$ plus $V_{S8}$, associated with the disturbance of the magnetic field caused by the presence of the metal particle. Although the amplitude of the component $V_{S8}$ of the output signal will be small compared to the signal $V_{S3}$ from the product, the signal $V_{S8}$ will not normally be in phase quadrature with the signal $V_{ref}$. Thus, the component $V_m$, the difference between $V_p$ (an extension of $V_{S3}$) and the sum of $V_{S3}$ plus $V_{S8}$, (see FIG. 2) will not be cancelled by the phase sensitive detector and thus the output signal from phase sensitive detector will increase. This can be used to trigger an alarm when a predetermined threshold is exceeded.

The above system works well for detecting metals having magnetic or conductive properties, where the phase of the component of the output signal associated with the metal occurs at a substantially different phase angle to that of the component associated with the product. However, in the case of stainless steel, which typically is only one fifth as conductive as copper and has only one hundredth the ferromagnetic properties of iron, the component of an output signal associated with the magnetic and conductive properties, can be substantially in anti-phase leaving mainly a resistive component, for example $V_{S5}$ of FIG. 3. Therefore, in the case of stainless steel, the phase of the output signal generated may substantially correspond to the output signal from the product. However, the magnitude and phase of the output signal will depend upon the frequency of the drive signal and the size of the stainless steel particle. Thus, the component of an output signal associated with such a metal could be represented for example by any one $V_{S4}$ to $V_{S7}$ in FIG. 3. That is to say that at a particular frequency the component of the output signal generated by a metal particle of a particular size will be in phase with the component of the signal generated by the product. Similarly, for a particular particle size and frequency there may be a particular combination of product and metal wherein the component of the output signal generated by the metal particle will be in phase with the component of the signal generated by the product. Thus, the components of the output signal generated by the metal particle in these circumstances will be in phase quadrature with the reference signal and will not be detected by the phase sensitive detector.

To address the above problem, a frequency can be selected whereby for a metal contaminant of a known type, the phase of the component of the output signal associated with that metal particle will be out of phase with the component of the output signal associated with a product of a known type. However, even then there is a possibility that for one particular particle size, the phase of the resultant output signal for that metal particle size will again correspond to the phase associated with the product.

In known commercially available detectors, of which the applicant is aware, the excitation coil current is a pure sign wave, derived from a tuned circuit driven from a low power square wave, at a frequency selected appropriate for detecting a known metal type in one or more product types. To address the above discussed problems, some detectors offer a selection of drive frequencies (typically three) whereby a drive frequency is selected for a specific application. This drive frequency is selected by connecting one of several sets of tuning capacitors, so that the device can operate at the appropriate frequency, but this frequency is unlikely to be a optimum frequency for any particular product, metal pair.

In accordance with a first aspect of the present invention, there is provided apparatus for scanning a product to detect metal on, in or associated with that product, the apparatus comprising a means for establishing an alternating magnetic field in a coil system and means for sensing changes in that field caused by the passage of the product and any metal on, in or associated with the product characterised in further comprising a drive circuit for establishing the alternating magnetic field which drive circuit comprises a plurality of switches and a controller for said switches, the controller and switches being arranged to alternately connect the coil system directly across a potential difference to cause the coil system to be driven at an operating frequency determined by the operation of the switches.

By controlling the input to the coil using a plurality of switches, instead of the conventional tuned circuit, it is possible to program the controller to operate the plurality of switches to obtain any desired frequency of operation. However, driving the coil system by a square wave (or a trapezoidal wave due to the inductance of the coil) generates a large number of relatively high energy harmonics compared with the conventional sinusoidal signal generated by a tuned circuit. Preferably, the apparatus further comprises a detection circuit for deriving a signal from the coil system wherein the detection circuit comprises a phase sensitive detector coupled to a low pass filter, for by employing a phase sensitive detector coupled to a low pass filter, a high level of rejection of out of band signals is obtained, enabling the phase sensitive detector to cope with the harmonics that may otherwise swamp the output signal it is desired to detect.

The above invention permits a detector to be operated at substantially any desired frequency, which may be in the range of 40 to 900 KHz in 1 Hz increments. It is therefore possible to operate the detector at a frequency which not only permits a desired particle type to be detected in a particular product, but enables sensitivity of the detector to be optimised by selecting the optimum frequency of operation. Furthermore, because the frequency of operation can easily be controlled by controlling the operation of the switches by electronic programming means, as compared to selecting a specific tuned circuit, it is possible for a user to select a frequency of operation which gives the optimum sensitivity.

Therefore, the present invention permits a standard detector to be manufactured for a wide range of product types and metal contaminants, such that a standard machine can be bought, off the shelf, and installed on a product line without having to first either ascertain the suitability of the machine or select one of a limited number of frequencies to operate the detector at.

Preferably, the drive circuit comprises four switches arranged as a full bridge circuit wherein the coil system is connected across the output of the bridge.

The coil system may comprise a drive coil and a detection coil wherein the drive coil is connected across the output of the full wave bridge. Alternatively, the drive circuit can comprise two switches alternately connecting the coil system across two potential differences of opposite polarity.

Advantageously, the drive circuit includes a monitor for the supply current to the coil system wherein, the drive circuit, in response to a signal from the supply current monitor, limits the period for which the coil system is connected across the potential difference to restrict current through the coil system. This permits the coil system to be driven at a constant frequency while regulating the current through the coil system to prevent excessive heat being generated.

Advantageously, the drive circuit is arranged to operate the coil system at a selected one of a plurality of different frequencies, preferably in excess of ten.

Preferably, the apparatus further comprises a detection circuit for monitoring an output of the coil system. The drive circuit can then be arranged to monitor the output of the detection circuit and to select a frequency of operation in dependence thereon in order to maximise the sensitivity of the apparatus. This would enable a machine to simply be installed and switched on, the machine monitoring its own operation and selecting an appropriate drive frequency for a particular product type. This would also permit different product types to be used with a detector, with the detector recognising when it is necessary to select a different frequency.

Preferably, the drive circuit comprises a microprocessor and an electronically programmable logic device, the output of which electronically programmable logic device controls said switches, wherein for a particular coil system, a plurality of drive maps are stored in the electronically programmable logic device each containing a switching sequence for the switches for a respective predetermined frequency of operation of the apparatus. The microprocessor can then select an appropriate map depending on the selected frequency of operation. This provides a convenient way of ensuring the switches are controlled in an appropriate and precisely predetermined manner for any particular frequency selected.

The apparatus of the invention will normally comprise an annular casing arranged to permit the product to pass therethrough, with the coil system located in the casing.

Advantageously, the coil system comprises a drive coil and a detection coil and one of the drive coil or detection coil comprises two coils at separate locations, arranged such that the presence of a metal will distort the magnetic field associated with the drive coil and produce an imbalance in the output of the detection coil, resulting in none zero output. (A single drive coil with the detector coil comprising two coils arranged to either side of the drive coil is equivalent in operation to an arrangement wherein the drive coil comprises two drive coils located to either side of a single central detector coil.)

Preferably, the first of said two coils is arranged in a plane perpendicular to the direction in which the product is to pass and is located on one side of the product only, wherein the second of said two coils is arranged in a plane perpendicular to the direction in which the product is to pass and is located on the other side the product only. The two coils may be placed one above and one below the product, and each comprise a square loop of conductor. This arrangement minimises variations caused by the positional location of any metal contaminant as it passes through the detector and helps to provide a uniform sensitivity regardless of the position of the metal contaminant.

Preferably, said two coils are electronically connected in parallel. By connecting the coils in parallel, in contrast to a more conventional series arrangement, the apparent power of the output signal is the same as for the series arrangement but the impedance value for the two coils is one quarter of that for an equivalent series arrangement. This greatly reduces the harmonics picked up by detection coil, which is particularly important when the drive coil is driven by the switch arrangement of the invention.

Preferably, a screen is located between the detection coil and the product, which screen comprises a non-conductive planar substrate with closely spaced conductive tracks arranged in parallel on both sides of the substrate. The conductive tracks can be connected to earth and therefore minimise any changes in capacitance experienced by the detector coils due to the passage of product, without producing any significant effect on the lines of magnetic flux produced by the drive coil.

Where the apparatus comprises an annular casing through which the product is to pass, one or more of said screens preferably extend completely around the aperture through which the product passes.

The apparatus of the invention is preferably used for detecting metal particles in food products with the apparatus comprising an annular casing and a conveyor belt passing through the casing on which the food product is conveyed.

Preferably, the apparatus is arranged to sequentially switch between at least two different operating frequencies such that any metal particle in a product will be subject to scanning at different frequencies. The invention permits the frequency of operation to be rapidly changed and can be arranged so that the frequency is switched so that any metal particle passing through on a conveyor belt will be scanned at two or more different frequencies. This ensures that should the metal particle type and size be such that at a specific frequency the phase of the component of this output signal due to the metal particle corresponds to the phase of the output signal from the product, and thus is masked by the output signal of the product, then at the second frequency, the phase of the two components will change by different amounts, such that the signal from a metal contaminant will be distinguishable from that generated by the product. By switching between many frequencies, one frequency should provide substantially an optimal sensitivity for any particular metal type, size and orientation.

According to a second aspect of the invention there is provided apparatus for scanning a product to detect metal in that product, the apparatus comprising a drive coil, a drive circuit for the drive coil, a detection coil and a detection circuit arranged to receive an output signal from the detection coil, characterised in that the drive circuit sequentially operates the drive coil at a plurality of different frequencies such that any metal particle in a product will be subject to scanning at different frequencies.

One embodiment of the present invention will now be described, by way of example only, with reference to the accompanying figure, of which:

Figure 1:
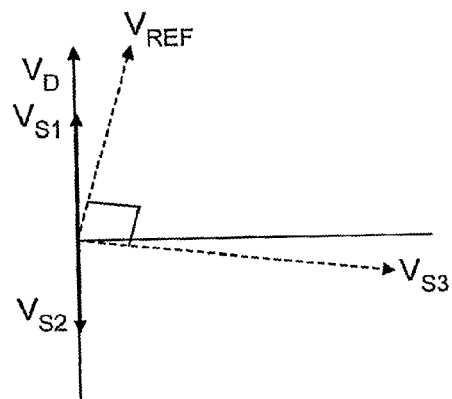
FIGS. 1 to 3 are phase diagrams depicting the relative phase and amplitude of the drive signals and output signals of metal detection apparatus.
Figure 2:
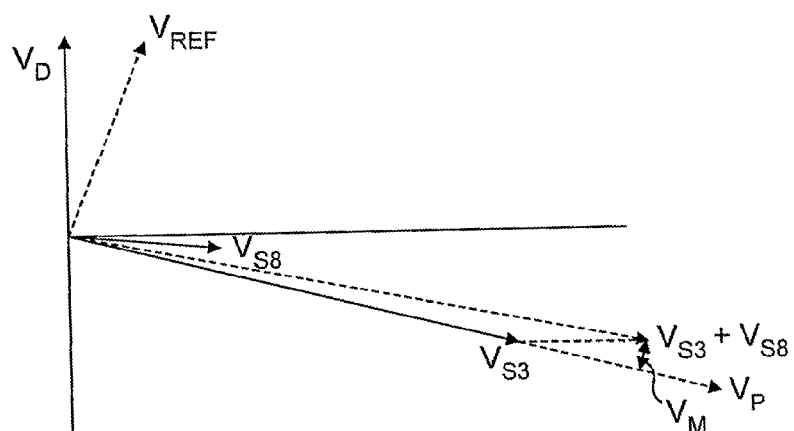
Figure 3:
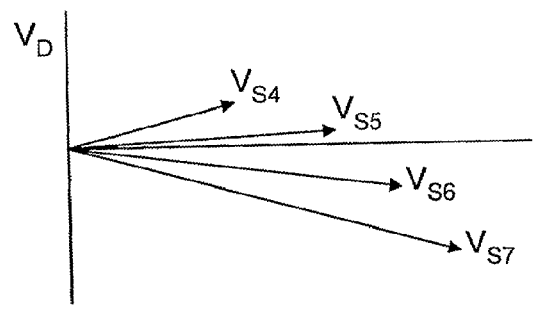
Figure 4:
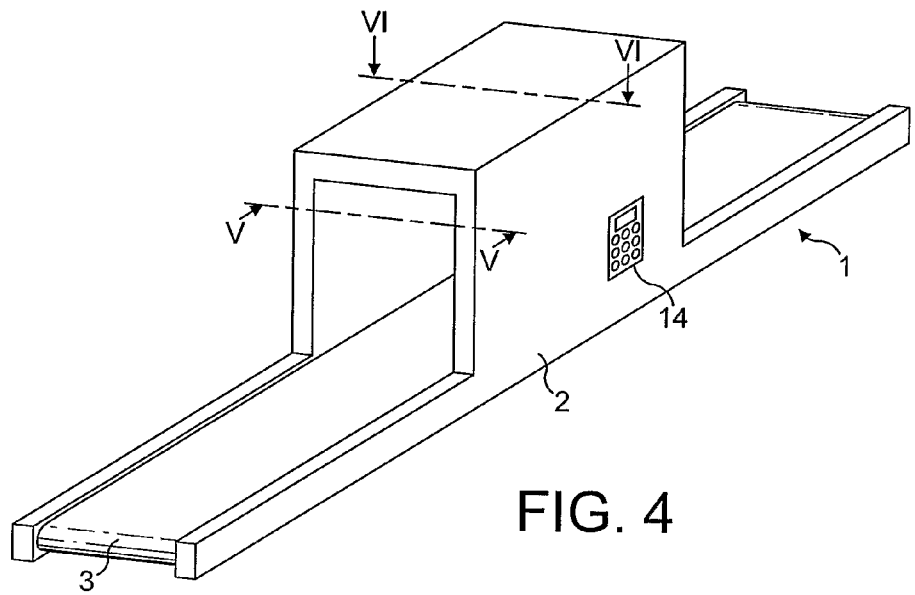
FIG. 4 is a perspective view of metal detection apparatus in accordance with the present invention.

Referring to FIG. 4 there is depicted metal detection apparatus in accordance with the present invention, indicated generally as 1 comprising a casing 2 through which conveyor belt 3 extends.

Figure 5:
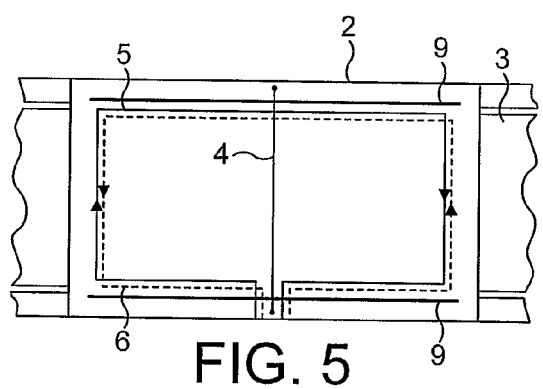
FIG. 5 is a horizontal section through the plane V-V of FIG. 4.
Figure 6:
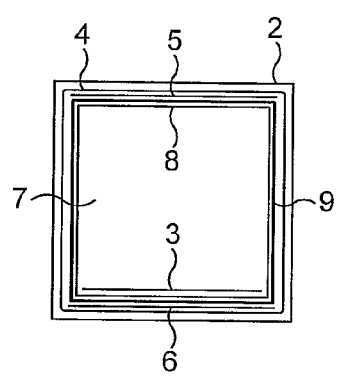
FIG. 6 is a vertical section through the plane. VI-VI of FIG. 4.

As shown in FIG. 5 (a horizontal sectional through the plane V-V of FIG. 4) and FIG. 6 (a vertical section through the line VI-VI), within the casing 2 there is a single turn drive coil 4 arranged in a plane perpendicular to that of the conveyor belt 3. A first detector coil 5, comprising a square loop of conductor, is arranged in the top portion of the casing above the conveyor belt with a substantially identical second coil 6, comprising a square loop of conductor, located below the upper portion of the conveyor belt 3.

The apparatus has a central aperture 7 through which food or other product to scanned may pass on the conveyor belt 3. The casing 2 is metallic and therefore provides a shield around the coils 4, 5 and 6 shielding them and the aperture 7 from external electromagnetic fields.

An inner surface 8 of the aperture is lined with a non-conductive, non-magnetic material which has no significant effect on the electromagnetic fields generated by the coil 4.

Figure 8:
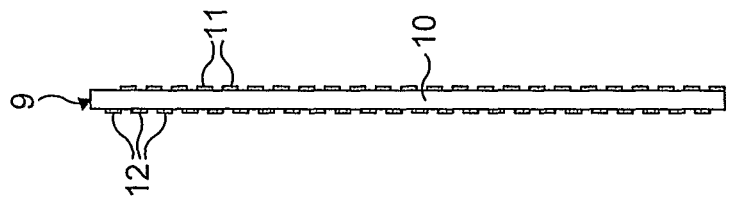
FIG. 8 is a cross-section along the line of FIG. 7.
Figure 7:
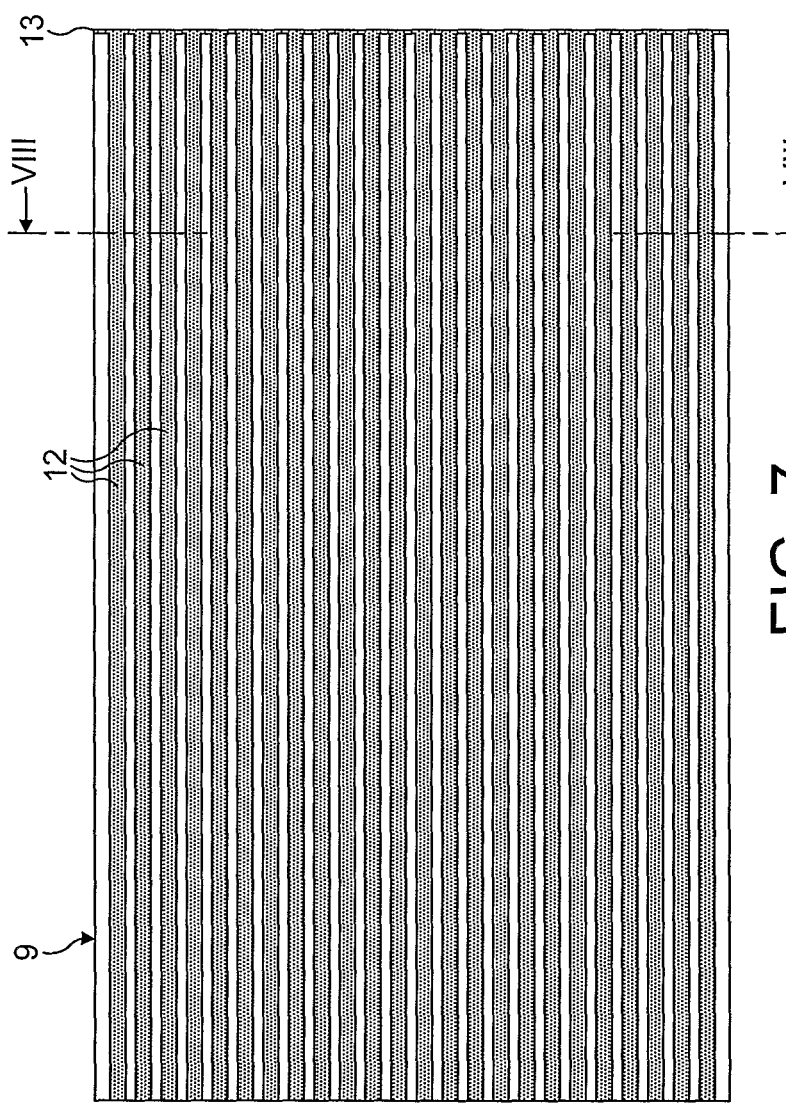
FIG. 7 is a plan elevation of a ground plane of the apparatus of FIG. 4.

Between the coils 4, 5 and 6 and the inner casing 8 there is located a ground plane 9 formed of four sheets, each as illustrated in FIGS. 7 and 8, extending around the aperture 7.

As seen from FIG. 7 and FIG. 8 (FIG. 8 is a cross-section through the line VIII-VIII of FIG. 7) the ground plane 9 comprises a non-conductive substrate 10 with conductive tracks 11 and 12 on the two respective sides, formed by standard photo-resist and etch techniques used in the production of printed circuit boards. Each of the conductive tracks 12 is linked at one edge by conductive strip 13 and a similar strip, not shown, links tracks 11. These strips are connected to earth thereby connecting all of the tracks 11 and 12 to earth. The width of each of the tracks 11, 12 is approximately 2 mm with 0.5 mm gaps between adjacent tracks 11, 12. The substrate 10 comprises a 0.8 mm thick printed circuit substrate.

The tracks 11, 12 are arranged axially relative to the drive coil and the gaps between tracks 11, 12 permit the magnetic flux associated with drive coil 4 to pass therethrough. However, the arrangement of the conductive tracks 11 and 12 located between the drive coil 4 and the product provide an earth plane to any electric field between the detection coils 5 and 6 and the product and therefore prevent any capacitive coupling between the sensing coils 5, 6 being affected by the product passing through the aperture 7.

The casing 2, depicted in FIG. 4, additionally comprises a drive circuit for the drive coil 4 and a detection circuit for the detection coils 5 and 6. These circuits are contained in a module 14 which includes a display and keypad, which are operable through an aperture in one side of the cabinet 2, as shown in FIG. 4.

Figure 9:
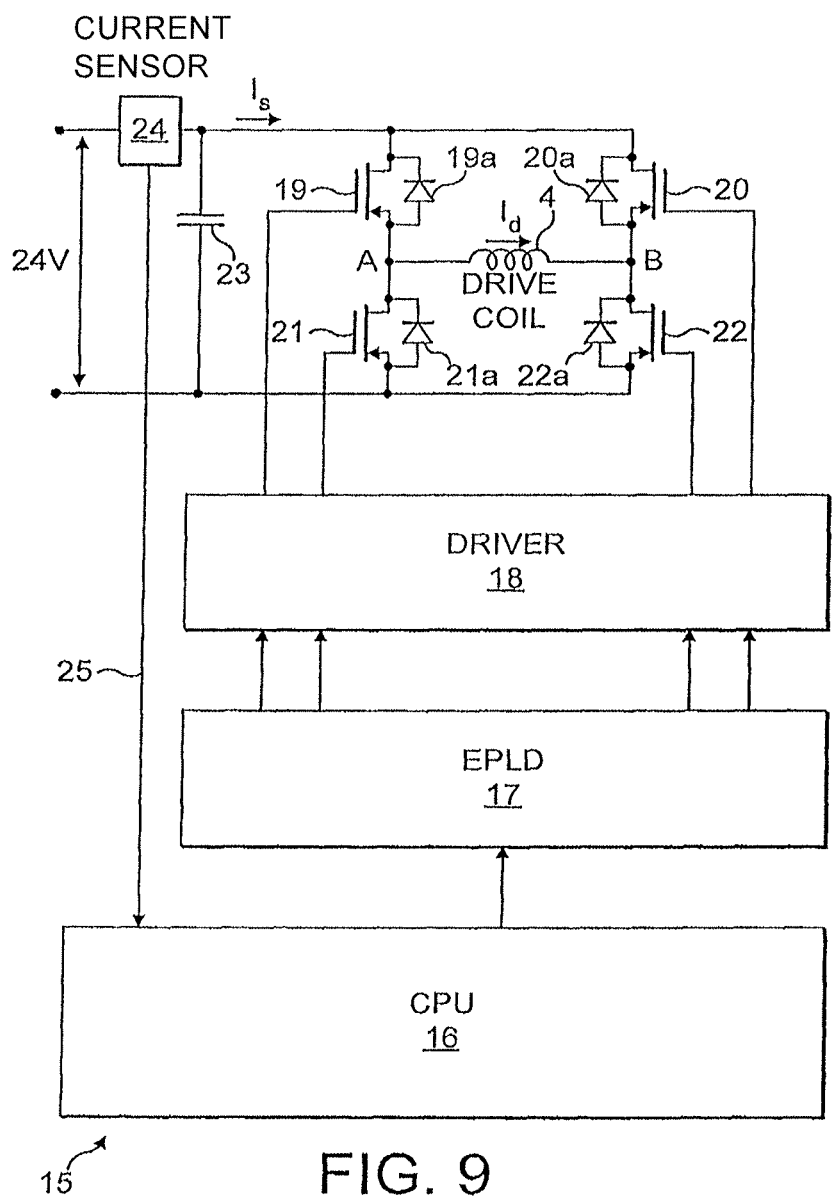
FIG. 9 is a circuit diagram of the driver circuitry for a drive coil of the apparatus of FIG. 4.

Referring now to FIG. 9, there is illustrated the drive circuit for the driver coil 4 of FIGS. 5 and 6. The drive circuit, indicated generally as 15, comprises a central processing unit (CPU) 16, an electrically programmable logic device (EPLD) 17 and a driver 18 connected to four field effect transistors (FETs) 19, 20, 21 and 22.

The four FETs 19 to 22 form a full wave bridge circuit across a twenty four volt potential difference, with the coil 4 connected across the output of the bridge circuit. Additionally, a current sensor 24 is connected in the power supply, the output of which provides a signal on line 25 back to the CPU 16. The circuit additionally comprises four diodes 19a to 22a connected across respective FETs 19 to 22 and capacitor 23 connected across the supply.

Figure 10:
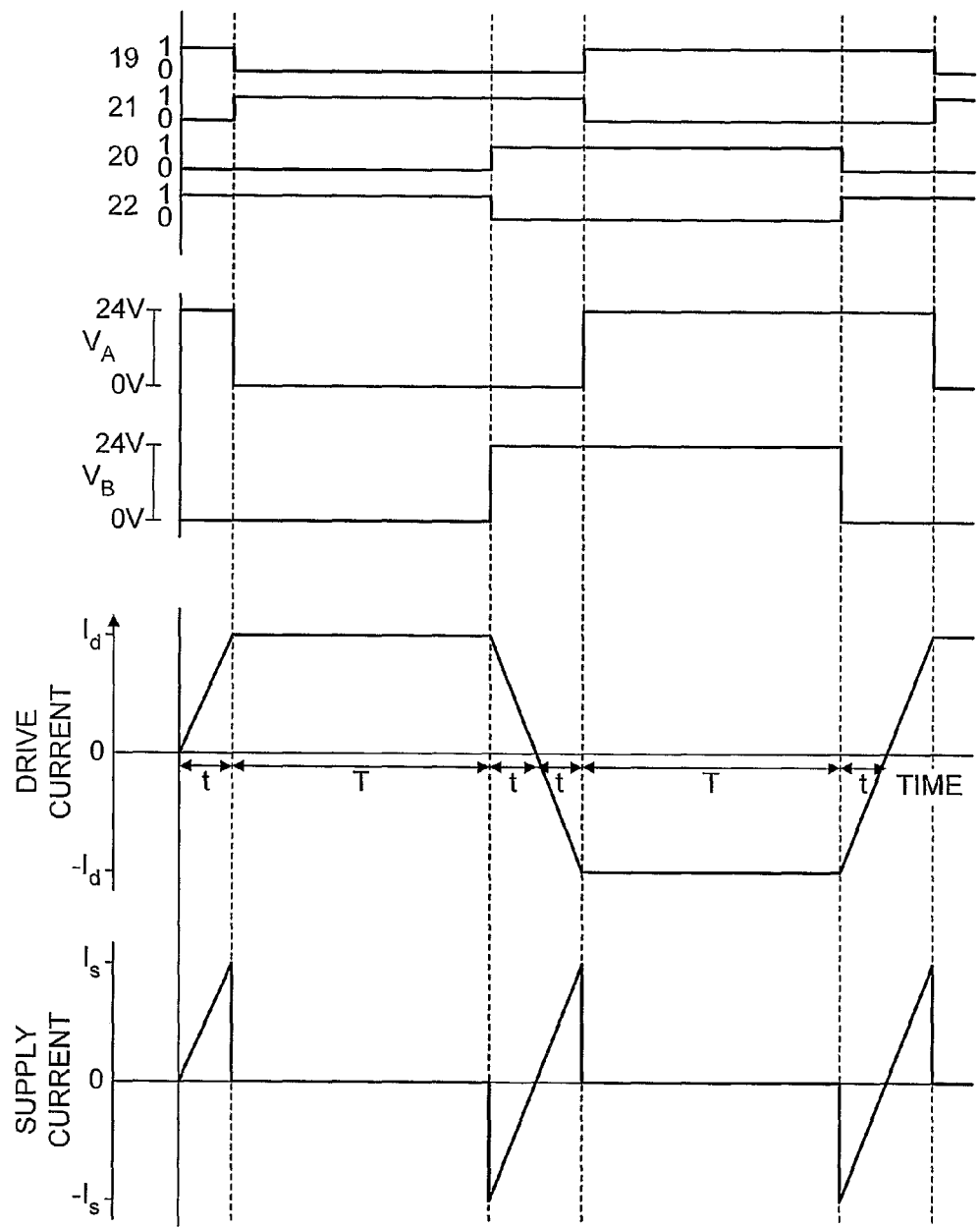
FIG. 10 is a timing diagram relating to the operation of the circuit of FIG. 9.

The operation of the drive circuit 15 of FIG. 9 is described below with reference to the timing diagrams of FIG. 10. These timing diagrams represent, with respect to time, the state of: the field effect transistors 19 to 22; voltage at points A and B of the circuit of FIG. 9; the drive current $I_d$ through the drive coil 4; and the supply current $I_s$ as detected by the current sensor 24.

Starting with all switches open and no drive coil current flowing, FET switches 19 and 22 are first closed. For the moment, ignore all losses in the circuit, ie the drive coil and switches have zero resistance and there are no stray capacitances around the circuit elements. The drive coil 4 has twenty four volts across it, so the drive coil current ($I_d$) increases linearly. $I_d$ is drawn from the power supply. After an interval, t, FET 19 is turned off and FET 21 on. This places a short circuit across the drive coil 4, so $I_d$ continues to flow through the drive coil, FET 21 and FET 22. No current is now being drawn from the supply.

After a second interval, T, FET 22 is turned off and FET 20 on. $I_d$ now flows back into the power supply including capacitor 23 connected across the power supply. After t, $I_d$ and $I_s$ have fallen to zero. The pulse of current taken from the power supply during the first "t" is identical to that returned to it during the second "t".

After a further time t, the coil current has risen to $-I_d$. Now $I_s=-I_d$. FET 21 is now turned off and FET 19 on and $I_d$ continues to circulate through the drive coil, FET 19 and FET 20. After a second interval, T, FET 20 is turned off and FET 22 on. $I_d$ now flows back into the power supply. After a further "t", $I_d$ (and $I_s$) has fallen to zero. This sequence is repeated.

The supply voltage 22 is chosen as a convenient twenty four volt. The rate of change of coil current is then inversely proportional to the coil inductance so the final value of $I_d$ for a given driver coil 4 is proportional to t.

The period of the resulting waveform is (4 t+2 T).

Setting t and T controls, the drive current and period (or frequency) of the drive. These are chosen to optimise the metal detection capability in any application.

In practice, there are losses in all circuit elements. The principal losses are:—

The switches dissipate power during switching, and possess stray capacitance between all terminals. This means that extra current is taken from the supply during switching.

The FETs have finite "on" resistance and there is dissipation in the coil and lead-outs, so the current waveform "droops" during T. This means that there is less current to be returned to the supply during the text t, so there is a net current drawn from the supply.

The detection of metal requires a strong magnetic field alternating at the required frequency. Such a field is set up by the current through the drive coil, and is independent of the voltage across it. The field contains a considerable harmonic content along with the fundamental frequency of operation. However, the detection circuits can disregard such harmonics as will be described below. At the maximum frequency, T becomes zero and the current waveform is triangular. Although the proportion at the fundamental is reduced, this reduction is not serious. At low frequencies, when T is long, there is considerable "droop" during T. The proportion of fundamental now drops considerably. Very low frequencies are only used for products giving huge signals, so even a significant drop in drive is not likely to be a limiting factor.

In order to be certain that two FETs of a pair are never conducting the same time, it is necessary to introduce a dwell after turning off one FET before turning on the other. Each FET embodies a respective diode 19a to 22a across it. Immediately after FET 19 turns off in the above sequence, in order for $I_d$ to continue flowing, "A" goes negative until caught by the diode embedded in FET 21. The voltage drop across an "on" FET is less than that across a diode, so when FET 21 turns on after the dwell, the current diverts to FET 21. Note that, when fully on, a FET maintains its low resistance regardless of the direction of the current. The sequence is the same for the other pair of FETs 20, 22.

In order to provide a satisfactory drive current, typically 10 A peak to peak, but to keep power dissipation to safe levels, the supply current is set at 250 mA. It is too complex to predict the value of t that will give this current for each size of detector at every operating frequency. Therefore, current sensor 24 is included. After the frequency has been selected, the CPU 16 gradually increases t until a supply current of approximately 250 mA is reached.

Some products give signals that are so large that they would saturate the detection coil amplifiers. In such situations, the CPU can detect a signal from the detection circuitry described below and "t" can be selected to give a greatly reduced drive, at the expense of reduced sensitivity.

From the above, it is seen that operation of the four FETs can be used to control "t" and "T" and thus control both the frequency of operation and the drive current to optimise the sensitivity of the detector circuit, by using a feedback signal from the detection circuitry indicating when the detection coils are saturated.

The CPU 16 in dependence upon the information stored in look-up tables (not shown) selects one drive map stored in the electronically programmable logic device 17 which then sends appropriate signals to driver 18 to repeatedly control operation of the FETs 19 to 22 in a predetermined manner.

In a preferred embodiment, the CPU 16 causes the drive circuit 15 to operate sequentially at two different frequencies as will be described below, with reference to FIGS. 11 and 12.

Figure 11:
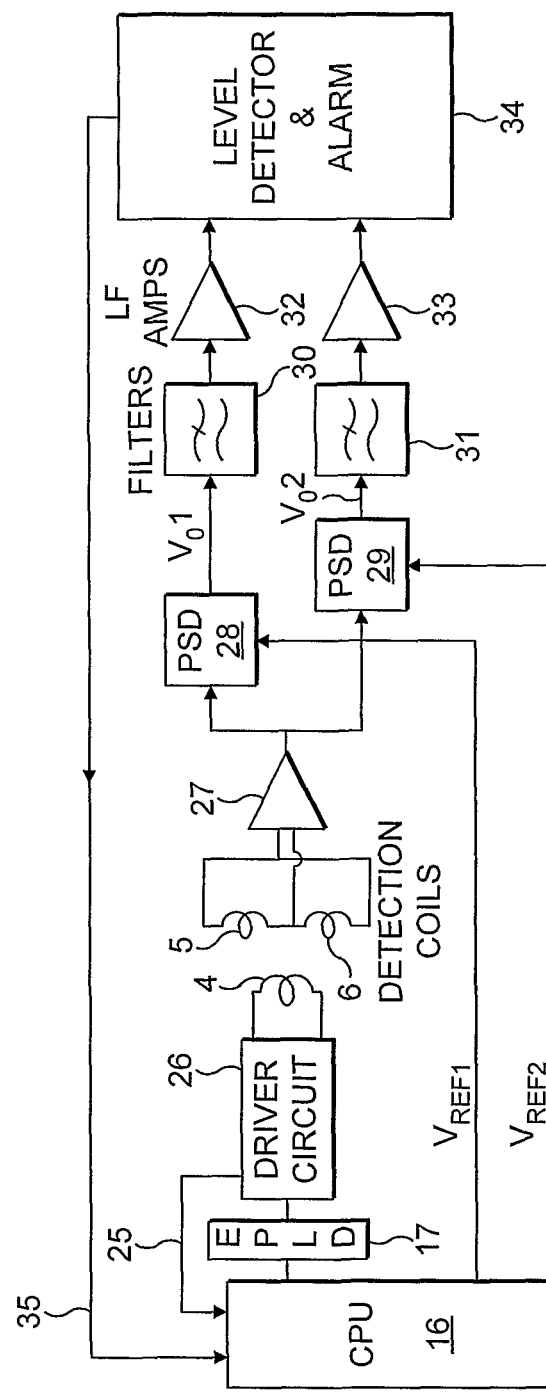
FIG. 11 is a circuit diagram showing both the driver circuit and detector circuit of the apparatus of FIG. 4.
Figure 12:
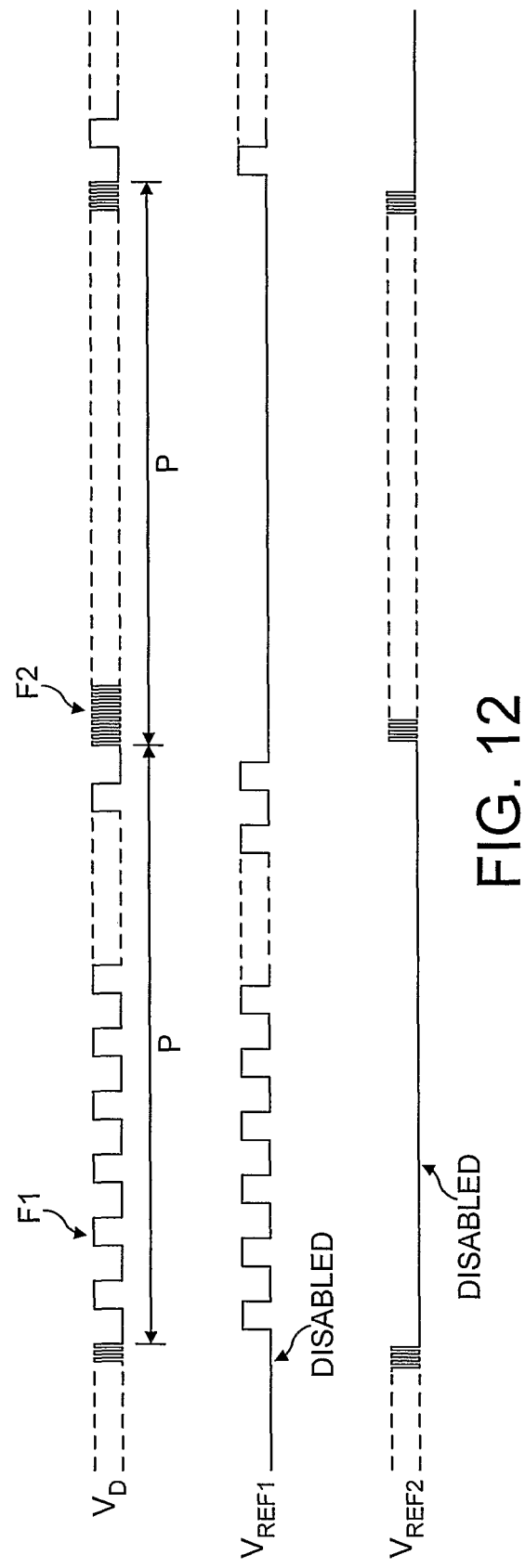
FIG. 12 is a timing diagram relating to the operation of the circuit of FIG. 11.

Referring now to FIGS. 11 and 12, there is illustrated in FIG. 11 a preferred embodiment of the invention comprising the driver circuit of FIG. 9 along with appropriate detection circuitry. In the arrangement depicted in FIG. 11, the driver 18, FETs 19 to 22 and diode 19a to 22a of FIG. 9 are for simplicity represented as driver circuit 26, with the output connected across drive coil 4.

The detection coils 5 and 6 of FIGS. 5 and 6 are shown connected in parallel with their outputs connected to high frequency amplifier 27.

In the embodiment of FIG. 11, the CPU 16 is programmed to alternately cause the drive coil 4 to be driven at first and second frequencies for consecutive periods P, as illustrated in the timing diagram of FIG. 12. The CPU 16 establishes two reference square wave signals $V_{ref1}$ and $V_{ref2}$ which, as shown in the timing diagram of FIG. 12, are alternatively disabled. $V_{ref1}$ and $V_{ref2}$ are input to the phase sensitive detectors 28 and 29, respectively, together with the output of the high frequency amplifier 27. The respective output $V_o1$ and $V_o2$ of each phase sensitive detector 28, 29 is passed through respective low pass filters 30 and 31, whose respective outputs are amplified by low frequency amplifiers 32 and 33 before passing to level detector and alarm unit 34. This unit 34 triggers an alarm is the signal from either of the low frequency amplifiers 32 or 33 exceeds a predetermined threshold.

The level detector 34 also provides a feedback via line 35 to the central processor unit 16, so that the central processor unit can detect when the detection coils 5, 6 are saturating and in response thereto select a different drive map from the EPLD 17. The signal received on line 35 from the level detector 34 enables the CPU to periodically select different drive frequencies and monitor the sensitivity at a particular frequency and subsequently to determine a particular frequency or selection of frequencies to optimise sensitivity.

In operation, the CPU 16, EPLD 17 and drive circuit 26 produce square waves of precise frequencies and phase relationships as required by the application.

FIG. 12 shows the drive waveform ($V_D$) toggling between the two frequencies, F1, F2. "t" typically 2 mS, gives a toggling frequency of 250 Hz. F1 and F2 may be 100 kHz and 400 kHz respectively. This drives a substantial current, typically 10 A peak to peak, through the drive coil 4.

The signal from the product is sensed by the search coil and amplified by the HF amp.

The controller produces a reference square wave, $V_{ref1}$, when the drive coil 4 is being driven at F1 and is held in a disabling state when the drive coil 4 is being driven at F2.

The output of the phase sensitive detector PSD 28 is $V_o1$. $V_o1 = K \cdot V_{in} \cdot \cos A$, where K is a constant, $V_{in}$ is the signal at the output of the HF amplifier 27 and A is the phase difference between $V_{in}$ and $V_{ref1}$. It is disabled when $V_{ref1}$ is disabled.

The controller sets the phase of $V_{ref1}$ so that, for non-contaminated products, A is 90 degrees. Cos A is therefore zero and $V_o1$ is also zero. Most metals produce a signal of a different phase from the product. Such a signal would therefore have different values for A, and yield a non-zero signal at $V_o1$. This signal is then amplified and filtered. The toggling frequency is chosen to be much higher than the cut-off point of the low pass element of the filter. This therefore averages $V_o1$. If large enough to be significant compared to the system "noise", it triggers an appropriate alarm.

Ref2 works in exactly the same way with PSD2 to yield independent detection at F2.

The specific embodiments hereinbefore described have been given by way of example only, and it will be appreciated that many modifications to the apparatus exist within the scope of the appended claims. In particular, the apparatus of FIG. 11 could be operated at a single frequency and employ a single phase sensitive detector band, pass filter and low frequency amplifier. Alternatively, the apparatus of FIG. 11 could be driven sequentially at more than two frequencies with an appropriate number of additional reference frequencies being generated and an appropriate number of additional phase sensitive detector, low pass filters and low frequency amplifier arrangements being included in the circuit.

What is claimed:

1. Apparatus for scanning a product to detect metal on, in or associated with that product, the apparatus comprising a means for establishing an alternating magnetic field in a coil system and means for sensing changes in that field caused by the passage of the product and any metal on, in or associated with the product, the apparatus being characterised in further comprising a drive circuit for establishing the alternating magnetic field which drive circuit comprises a plurality of switches and a controller for said switches, the controller and switches being arranged to alternately connect the coil system directly across a potential difference to cause the coil system to be driven at an operating frequency determined by the operation of the switches.

2. Apparatus as claimed in claim 1, further comprising a detection circuit for monitoring the coil system wherein the detection circuit comprises a phase sensitive detector coupled to a low pass filter.

3. Apparatus as claimed in claim 1, wherein the drive circuit comprises two switches alternately connecting the coil system across two potential differences of opposite polarity.

4. Apparatus as claimed in claim 1, where the drive circuit includes a monitor for the supply current to the coil system and wherein the drive circuit in response to a signal from the supply current monitor limits the period for which the coil system is connected across the potential difference so as to restrict the current through the coil system.

5. Apparatus as claimed in claim 1 wherein the plurality of switches are field effect transistors (FETs).

6. Apparatus as claimed in claim 1 for detecting metal in a food product.

7. Apparatus as claimed in claim 1, wherein the drive circuit comprises four switches arranged as a full wave bridge circuit, wherein the coil system is connected across the output of the bridge.

8. Apparatus as claimed in claim 7, wherein the coil system comprises a drive coil and a detection coil and wherein the drive coil is connected across the output of the full wave bridge.

9. Apparatus as claimed claim 1, comprising a screen located between the coil system and the product, the screen comprising a non-conductive planar substrate with closely spaced conductive tracks arranged in parallel on both sides of the substrate.

10. Apparatus as claimed in claim 9, comprising an annular casing through which the product is to pass, wherein one or more screens extend completely around the aperture through which the product passes.

11. Apparatus as claimed in claim 1 for detecting metal particles in product, the apparatus comprising an annular casing and a conveyor belt passing through the casing on which the product is conveyed.

12. Apparatus as claimed in claim 11, arranged to sequentially switch between at least two different operating frequencies such that any metal particle in a product will be subject to scanning at different frequencies.

13. Apparatus as claimed in claim 1, wherein the drive circuit is arranged to operate the coil system at a selected one of a plurality of different frequencies.

14. Apparatus as claimed in claim 13, wherein the drive circuit is arranged to operate the coil system at a selected one of at least ten different frequencies.

15. Apparatus as claimed in claim 13, further comprising a detection circuit for monitoring an output of the coil system wherein the drive is arranged to monitor the output of the detection circuit and in dependence thereon select a frequency of operation to maximize the sensitivity of the apparatus.

16. Apparatus as claimed in claim 13, wherein the drive circuit comprises a microprocessor and an electronically programmable logic device, the output of which electronically programmable logic device controls said switches, wherein for a particular coil system, a plurality of drive maps are stored in the electronically programmable logic device each containing a switching sequence for the switches for a respective predetermined frequency of operation of the apparatus, wherein the microprocessor selects an appropriate map depending on the selected frequency of operation.

17. Apparatus as claimed in claim 1, comprising an annular casing arranged to permit the product to pass therethrough, the coil system being located in the casing.

18. Apparatus as claimed in claim 17, wherein the coil system comprises a drive coil and a detection coil and one of the drive coil or detection coil comprises two coils at separate locations arranged such that the presence of a metal will distort the magnetic field associated with the drive coil and produce an imbalance in the output of the two coils of the detection coil resulting in a non-zero output from the detection coil.

19. Apparatus as claimed in claim 18, wherein the said two coils are electrically connected in parallel.

20. Apparatus as claimed in claim 18, wherein the first of said two coils is arranged in a plane perpendicular to the direction in which the product is to pass and is located only on one side of the product and wherein the second of said two coils is arranged in a plane perpendicular to the direction in which the product is to pass and is located only on the other side of the product.

21. Apparatus as claimed in claim 20, wherein each of said two coils comprises a square loop of conductor.

22. Apparatus for scanning a product to detect metal in that product, the apparatus comprising a drive coil, a drive circuit for the drive coil, a detection coil and a detection circuit arranged to receive an output signal from the detection coil, characterised in that the drive circuit sequentially operates the drive coil at a plurality of different frequencies such that any metal particle in a product will be subject to scanning at different frequencies.

* * * * *